United States Patent [19]

Fernandez

[11] Patent Number: 5,011,356
[45] Date of Patent: Apr. 30, 1991

[54] PANEL FASTENER

[75] Inventor: Miguel C. Fernandez, Sao Paulo, Brazil

[73] Assignee: ITW-Mapri Industria e Comercio LTDA, Sao Paulo, Brazil

[21] Appl. No.: 469,905

[22] Filed: Jan. 25, 1990

[51] Int. Cl.$^5$ .............................................. F16B 21/00
[52] U.S. Cl. ................... 411/553; 411/508; 411/913; 411/908; 24/297
[58] Field of Search ................... 411/508–510, 411/913, 349, 549, 552, 553, 908; 24/297, 453

[56] References Cited

U.S. PATENT DOCUMENTS 4,489,465 12/1984 Lemkin ............................... 411/508
4,762,437 8/1988 Mitomi ............................... 411/549
4,893,978 1/1990 Frano ...................................... 24/297

Primary Examiner—Neill R. Wilson
Attorney, Agent, or Firm—Schwartz & Weinrieb

[57] ABSTRACT

A quarter-turn fastener for securing together a plurality of overlapped panels comprises an elongated body portion having a longitudinal axis, a head provided upon one end of the body portion for engaging a first outer surface of one of the overlapped panels, and a pair of resiliently flexible fingers provided upon an opposite end of the body portion for engaging a second outer surface of a second one of the overlapped panels whereby the panels are preliminarily secured together by the fastener in a non-compressed state. A pair of diametrically opposed inclined cam portions are also provided upon the body portion at a position axially between the opposite ends of the body portion so as to engage the second outer surface of the second one of the overlapped panels such that when the fastener is rotated through means of an angular rotation of 90°, the cam portions force the second one of the overlapped panels toward the first one of the overlapped panels such that the panels are disposed in a compressed state upon completion of the 90° rotation of the fastener.

16 Claims, 2 Drawing Sheets

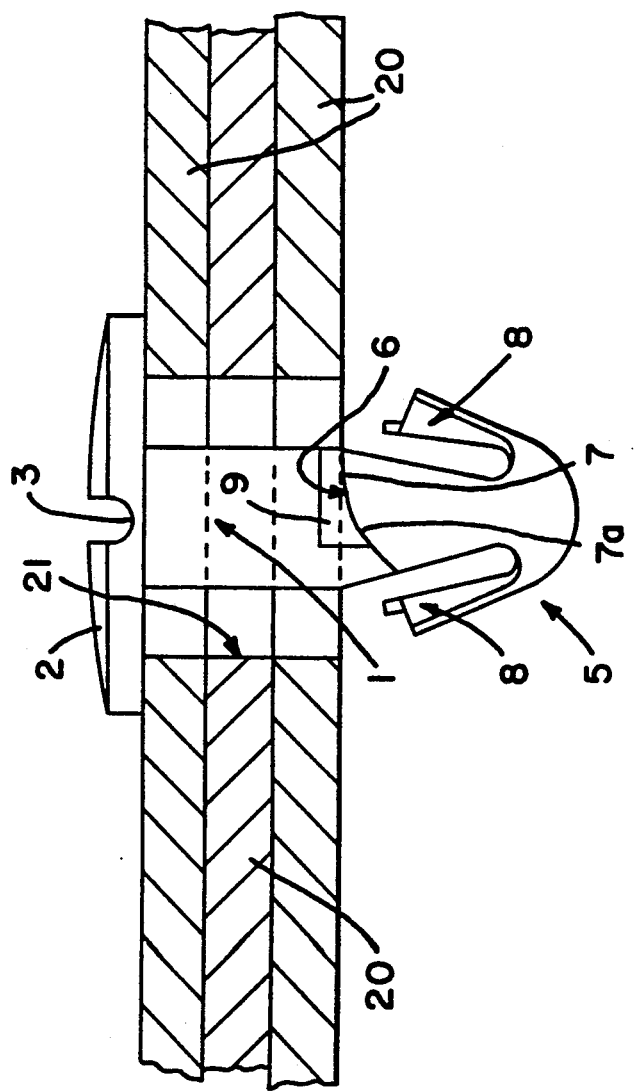

PANEL FASTENER

FIELD OF THE INVENTION

The present invention relates generally to panel fasteners, and more particularly to a fastener which is utilized in connection with retaining overlapped panels or plates in a fastened, laminated or sandwiched state, such as, for example, as may be required in connection with the fabrication of door or wall assemblies of appliances, such as, for example, refrigerators or freezers, walls of containers having thermal insulation incorporated therein, or any other structure which may comprise overlapping, laminated, or sandwiched plates or panels.

BACKGROUND OF THE INVENTION

In general, the assembly of structures which comprises a plurality of overlapping, laminated, or sandwiched plates or panels has been effected by means of various different types of fixing or fastening elements, such as, for example, pressure clamps, set screws and cooperating nuts, adhesives, and the like.

Although set screws and pressure clamps are widely used, they exhibit particular operational drawbacks or deficiencies, such as, for example, not being able to achieve a requisite amount of pressurizing capacity, or alternatively, they prove to be undesirably sensitive to external forces or environmental conditions which are exerted upon the structures or assembled walls whereby, for example, the structures or assembled walls or doors will undergo or experience a predetermined amount of displacement or stress which may consequently result in the development of play or looseness within the fastening elements per se, as well as adverse effects with respect to the sealing properties required in connection with the structural assembly.

While adhesive bonding type fastening means of overlapping, laminated, or sandwiched structures, panels, plates, or the like are also widely employed, such fastening means exhibit the obvious drawback or disadvantage of being, in effect, irreversible, non-removable, non-separable, or non-reuseable. In addition, such means does not necessarily or usually result in the achievement of an effectively sealed structure, as defined between the plurality of plates, panels, or the like, in view of the fact that sufficient compression of the plates, panels, or the like, is difficult to attain or maintain.

OBJECT OF THE INVENTION

Accordingly, it is an object of the present invention to provide a fastener for fastening together a plurality of overlapping, laminated, or sandwiched plates, panels, or the like, whereby a reliable, tight, sealed, and pressure or stress-resistant fastening, as defined between the plurality of plates or panels, can in fact be achieved and maintained.

SUMMARY OF THE INVENTION

The foregoing and other objectives of the present invention are achieved by means of the provision of a fastener for fastening together a plurality of overlapped, laminated, or sandwiched plates or panels wherein the fastener comprises a single-piece fastener, fabricated as a plastic molding, having a body portion which is at least equal to the thickness dimension of the overlapped, laminated, or sandwiched set of plates or panels when the latter plates or panels are initially or preliminarily disposed in a non-compressed state. A fixed head is provided upon one end of the body for engaging a first one of the plurality of overlapped, laminated, or sandwiched panels or plates, and a flared or expansible head is provided upon the other end of the body so as to be engageable with another one of the plurality of overlapped, laminated, or sandwiched panels or plates when the fastener is inserted through respective holes defined within the panels or plates. The flared head includes a base portion which, in turn, comprises flattened and sloped portions or regions which are provided at diametrically opposed positions with respect to a longitudinal axis of the fastener, and wherein further, such flattened and sloped portions are disposed upon opposite lateral sides of the body such that the diametrical dimension of such flattened and sloped portions is substantially greater than the diameter of the body portion per se. The flared head is further provided with a pair of diametrically opposed flexible legs or fingers which are disposed within a plane which is located mutually orthogonal with respect to the plane within which the pairs of diametrically opposed flattened and sloped portions are disposed. The flexible legs or fingers extend obliquely and radially outwardly from the flared head end of the fastener toward the fixed head end of the fastener, and when the fastener is inserted through the holes of the panels or plates, the flexible legs or fingers will engage the outer or undersurface of the panel which is remote from the panel with which the fixed head of the fastener is engaged. Consequently, the panels or plates are fastened together in a preliminary, non-compressed state. When it is desired to fasten the plurality of plates together in their sealed or compressed state, the fastener is rotated through means of an angular displacement of 90° whereby the sloped portions of the flared head serve, in effect, as camming means for engaging the lower or undersurface portion of the panel which is preliminarily engaged by means of the flexible legs or fingers of the fastener, whereupon the lower panel or plurality of panels, other than the panel which is engaged by the fixed head end of the fastener, are caused to move toward the uppermost panel, that is, the panel engaged by means of the fixed head of the fastener, whereby the plurality of panels are forced into a sealed or compressed state. The lowermost or bottom panel will then be supported upon the flattened portions of the flared head, and the flared head is further provided with shoulder portions engage sidewall portions of the hole defined within the lowermost or bottom panel so as to, in effect, lock the fastener at its 90° turned position and maintain the overlapped, laminated, or sandwiched panels or plates in their compressed state.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 3 is a view similar to that of FIG. 1, and as viewed from the same viewpoint as that of FIG. 1, wherein the fastener has been rotated 90° to its locked state with respect to the overlapped panels or plates whereby the panels or plates are now fastened together in their compressed state; and FIG. 4 is a transverse cross-sectional view of the fastener of the present invention as taken along the line 4—4 of FIG. 1.

DETAILED DESCRIPTION OF THE PREFERRED EMBODIMENT

Figure 1:
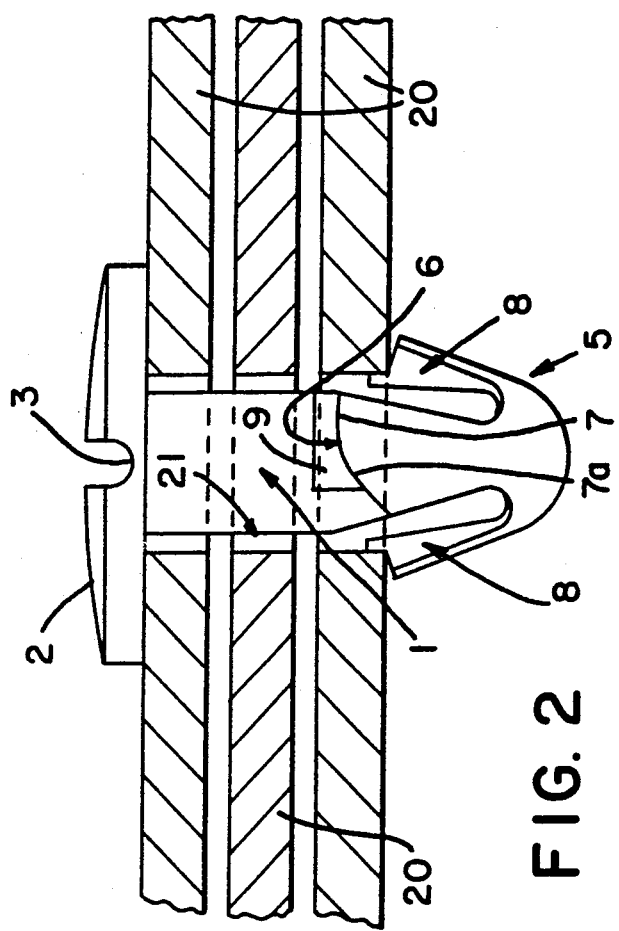
FIG. 1 is a transverse cross-sectional view of the plurality of overlapped panels or plates which have the fastener of the present invention inserted therein such that the panels or plates are disposed within a non-compressed or non-sealed state.

Referring now to the drawings, the fastener of the present invention comprises a one-piece plastic molding element which comprises a cylindrical body 1 which has a longitudinal length which is at least equal to or greater than the thickness of a plurality of panels or plates 20 when the same are disposed in a non-compressed, overlapped state as shown in FIG. 1. The body 1 has a fixed, circularly configured head 2 formed upon an upper or one end thereof, and the head 2 is provided with a diametrically extending slot 3 for accommodating a rotary tool blade, such as, for example, a screw driver blade, such that the fastener can be rotated through at least an angular displacement of 90° for reasons which will become apparent and which will be fully explained hereinafter. The longitudinally opposite end of the cylindrical body 1 is provided with an expansible or flared head 5 which has the configuration of an inverted pyramidal frustum, and wherein an upper base portion 6 thereof has a substantially rectangular configuration as best seen in FIG. 4. More particularly, it is seen that the smaller sides of rectangular base 6 are arcuately convex and disposed radially outwardly away from the cylinderical body 1, while one half portion of each longer side of rectangular base 6 is substantially tangent to cylindrical body 1 while the other half portion of the same longer side of rectangular base 6 is, in effect, an extension of a chord with respect to cylindrical body 1. It is also seen from FIG. 1 that the length of the longer sides of the rectangular base is slightly less than the diametrical extent of fixed head 2, while the lateral width of rectangular base 6, or in other words, the length of the smaller sides thereof, is slightly less than the diametrical extent of the cylindrical body 1.

Figure 2:
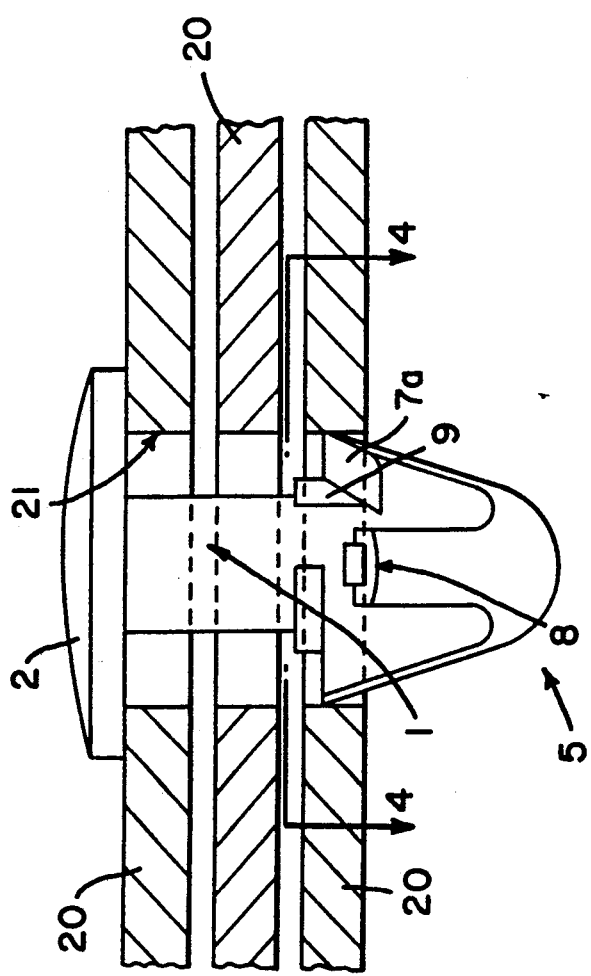
FIG. 2 is a view similar to that of FIG. 1 except that the panel and fastener assembly is being viewed from a viewpoint which is located 90° with respect to the viewpoint of FIG. 1.

As can also be readily seen from FIG. 4, the base 6 is longitudinally divided into two parts upon diametrically opposite sides of the cylindrical body 1 such that upon each side of the cylindrical body 1, the base 6 comprises a flattened portion 7 and a sloped portion 7a as also seen in FIGS. 2 and 3, with both portions 7 and both portions 7a, upon the opposite sides of cylindrical body, being disposed diametrically opposite each other.

The flared head 5 is further provided with a pair of diametrically opposed flexibly resilient legs or fingers 8 which are disposed within a diametrical plane which is mutually orthogonal with respect to the diametrical plane containing the rectangular base 6, or more particularly, longitudinal axis thereof. The legs or fingers 8 are integrally connected at lower ends thereof to the lower end portion of the fastener head 5 and are inclined radially outwardly and upwardly toward the fixed circular head 2 so as to be radially spaced from cylindrical body 1 and axially displaced from the rectangular base 6, that is, axially beneath base 6. It is further appreciated from FIGS. 1 and 4 that the flexibly resilient legs or fingers 8 are disposed at positions which correspond to the longitudinal or longer side edges of the base 6, and in this manner, the fingers or legs 8 can engage the lateral sidewalls of the panels 20 which define the apertures provided therein as the fastener is inserted through the panels 20. The base 6 of head 5 is also provided with a pair of diametrically opposed shoulder portions 9. While the configuration of the apertures 21 defined within the panels 20 are usually the same, in accordance with the present invention, it is only required that the aperture 21 defined within the lowermost panel 20, as viewed, for example, within FIGS. 1-3, have a substantially oblong or rectangular configuration. In this manner, as will be more fully explained hereinafter, when the fastener is rotated through means of an angular displacement of 90° from the position shown in FIGS. 1 and 2, to that shown in FIG. 3, in order to engage and fasten the panels or plates in their compressed and sealed state, the shoulder portions 9 will be moved into position so as to engage sidewall portions of the lowermost panel 20 which define aperture 21 so as to, in effect, lock the fastener within the panels 20 when the panels 20 are disposed in their compressed or sealed state and thereby prevent inadvertent rotation of the fastener from the locked state to an unlocked state whereby undesired disassembly of the panels could otherwise occur.

In accordance with the use of the fastener constructed in accordance with the present invention, the panels 20, having their respective holes or apertures 21 defined therein, over initially overlapped or disposed one above another as shown, for example, in FIGS. 1 and 2 such that the holes or apertures 21 are substantially coaxially aligned with respect to each other. The fastener of the present invention is axially inserted through the holes or apertures 21 of the panels 20 such that the fixed circular head 2 of the fastener engages the upper surface of the uppermost panel 20 as viewed in FIGS. 1 and 2, and when the fastener has been inserted sufficiently axially through all of the panels 20, the flared head 5 will be disposed beneath the lower surface of the lowermost panel, as viewed in FIGS. 1 and 2, and more particularly, after the flexible legs or fingers 8 have been radially inwardly compressed as a result of the engagement of such legs and fingers with the interior sidewalls of the panels 20 which define the holes or apertures 21 thereof, the resilient fingers or legs 8 will expand radially outwardly so as to engage lower rim or peripheral portions of the sidewalls of the lowermost panel 20 defining its respective aperture or hole 21, as best seen in FIG. 2. In this state, the fastener is temporarily secured within the panels 20 even though the panels 20 are disposed in their non-compressed and non-sealed state, and consequently, the fastener cannot be readily released from the panels 20, and conversely, the panels 20 cannot be readily separated from each other.

After the fastener has been inserted into the panels 20 so as to achieve the temporary fastening state shown in FIGS. 1 and 2, a rotary tool, such as, for example, a screwdriver, is inserted into the blade slot 3 defined within fixed circular head 2 of the fastener, and as a result of a rotary motion imparted to the fastener by means of the screwdriver, the fastener is rotated about its longitudinal axis through means of an angular displacement of 90°. As a result of such rotation, frustum head 5 is of course rotated 90° with respect to the panels 20, and in particular, with respect to the oblong, elongated, or substantially rectangularly configured hole or aperture 21 defined within the lowermost panel 20. As a result of such rotational movement relative to the panels 20, sloped portions 7a of frustum base 6 engage peripheral rim portions of the sidewalls defining the hole or aperture 21 within the lowermost panel 20, and as a result of an effective camming action defined between sloped portions 7a of base 6 and the lower peripheral aperture sidewalls of the lowermost panel 20, the lowermost panel 20, as well as any intermediate panel 20 interposed between the lowermost panel 20 and the uppermost panel 20, is caused to move upwardly toward the uppermost panel 20 whereby the panels 20 are compressed and sealed together in an overlapped, laminated, or sandwiched mode as a result of mutual engagement of the sloped portions 7a of base 6 and the fixed circular head 2 with the lowermost and uppermost panels 20. Upon completion of the 90° rotary movement of the fastener, the flattened portions 7 of the base 6 will engage undersurface portions of the lowermost panel 20, while the shoulder portions 9 of the base 6 will engage internal sidewall portions of the lowermost panel 20 which define the hole or aperture 21. The engagement of the shoulder portions 9 with the internal sidewall portions of the lowermost panel 20 which define the hole or aperture 21 within the lowermost panel 20 serves to effectively lock the fastener within the panels and to maintain the panels in their locked, compressed, and sealed state. It is to be noted that while the longitudinal length of the cylindrical body 1 of the fastener should have a maximum length substantially equal to the thickness dimension of the overlapped panels 20 when the same are disposed in their non-compressed state shown in FIGS. 1 and 2, the fastener should also have a minimum length substantially equal to the thickness dimension of the overlapped, laminated, or sandwiched panels 20 when the same are disposed in their compressed state as shown in FIG. 3.

Obviously, many modifications and variations of the present invention are possible in light of the above teachings. It is therefore to be understood that within the scope of the appended claims, the present invention may be practiced otherwise than as specifically described herein. For example, while the flared head 5 has a substantially spherical configuration at the lowermost end thereof, other configurations are of course possible in order to, for example, facilitate the insertion of the flared head 5 into the apertures of the panels, which may not always be properly or precisely coaxially aligned, or still further, head 5 may comprise additional structure which will facilitate its insertion or engagement with other panels, elements, substances, or materials which may be disposed beneath the lowermost panel 20.

I claim:

1. A fastener for fastening together a plurality of overlapping panels, having holes defined therein and through which said fastener is to be inserted for fastening said panels together, comprising:

a body portion having a longitudinal axis;

a head provided upon a first end of said body portion for engaging a first outer surface of a first one of said plurality of nanels when said fastener is inserted through said holes of said panels;

a pair of diametrically opposed resiliently flexible fingers provided upon a second end of said body portion for engaging a second outer surface of a second one of said plurality of panels when said fastener is inserted through said holes of said panels so as to fasten said panels together, between said head of said fastener and said flexible fingers, in such a state that said panels are disposed in a non-compressed overlapping state with respect to each other; and a pair of diametrically opposed inclined cam portions, provided upon said body portion at a position which is axially between said first and second ends of said body portion and within a plane substantially perpendicular to a plane within which said flexible fingers are disposed, for engaging said second outer surface of said second one of said plurality of panels when said fastener has been inserted through said holes of said panels so as to compress said overlapping panels together from said non-compressed state to a compressed, overlapped state when said fastener is rotated about said longitudinal axis thereof through means of an angular displacement of 90° from the position at which said flexible fingers engage said second outer surface of said second one of said panels.

2. A fastener as set forth in claim 1, wherein:

said body portion of said fastener has an axial length which is substantially equal to the thickness of said plurality of overlapped panels when said overlapped panels are disposed in said non-compressed state.

3. A fastener as set forth in claim 1, further comprising:

flattened portions, operatively connected to and substantially continuous with, said inclined cam portions for seating outer surface portions of said second outer surface of said second one of said plurality of panels when said plurality of panels are disposed in said compressed state.

4. A fastener as set forth in claim 1, further comprising:

shoulder portions, adjacent to said inclined cam portions, for engaging interior wall portions of said hole defined within said second one of said plurality of panels when said plurality of panels are disposed in said compressed state as a result of said 90° rotation of said fastener so as to prevent retrograde rotation of said fastener.

5. A fastener as set forth in claim 1, wherein:

said flexible fingers extend radially outwardly from said second end of said body portion toward said first head end of said body portion in an inclined manner with respect to said longitudinal axis of said body portion.

6. A fastener as set forth in claim 1, wherein:

said fastener comprises a one-piece plastic component.

7. A fastener as set forth in claim 1, further comprising:

slot means defined within said head for accommodating a tool for rotatably turning said fastener about said longitudinal axis thereof.

8. A fastener as set forth in claim 3, wherein:

said inclined cam portions and said flattened portions are disposed upon a base having a substantially rectangular parallelepiped configuration.

9. A fastener as set forth in claim 8, wherein:

said rectangular parallelepiped base has shorter sides thereof disposed radially outwardly of said body portion, while one longer side of said base is substantially tangent to said body portion and the other longer side of said base is in effect an extension of a chord of said body portion when viewed in cross-section.

10. A fastener as set forth in claim 9, wherein:
the length of said base, as defined by said loner sides thereof, is slightly less than a diametrical dimension of said head, while the width of said base, as defined by said shorter sides thereof, is slightly less than a diametrical dimension of said body portion.

11. A fastener as set forth in claim 3, wherein:
said flattened portions are disposed substantially diametrically opposite each other.

12. A fastener as set forth in claim 4, wherein:
said shoulder portions are disposed substantially diametrically opposite each other.

13. A fastener as set forth in claim 8, wherein: said base is longitudinally divided along a plane which substantially corresponds to a diametrical plane of said body portion, and said inclined cam and flattened portions of said base are disposed upon opposite sides of said plane.

14. A fastener as set forth in claim 1, wherein:
said body portion comprises a cylinder.

15. A fastener as set forth in claim 8, wherein:
said fingers are integrally mounted upon said second end of said body portion which has the form of an inverted pyramidal frustum.

16. A fastener as set forth in claim 15, wherein:
a larger diametrical end of said pyramidal frustum, which is proximal to said head of said fastener, is integral with said base, while a smaller diametrical end of said pyramidal frustum, which is distal from said head of said fastener, has the configuration of a spherical cap.

* * * * *